GLADDEN & BISHOP.
Cane-Stripper.
No. 50,350. Patented Oct. 10, 1865.
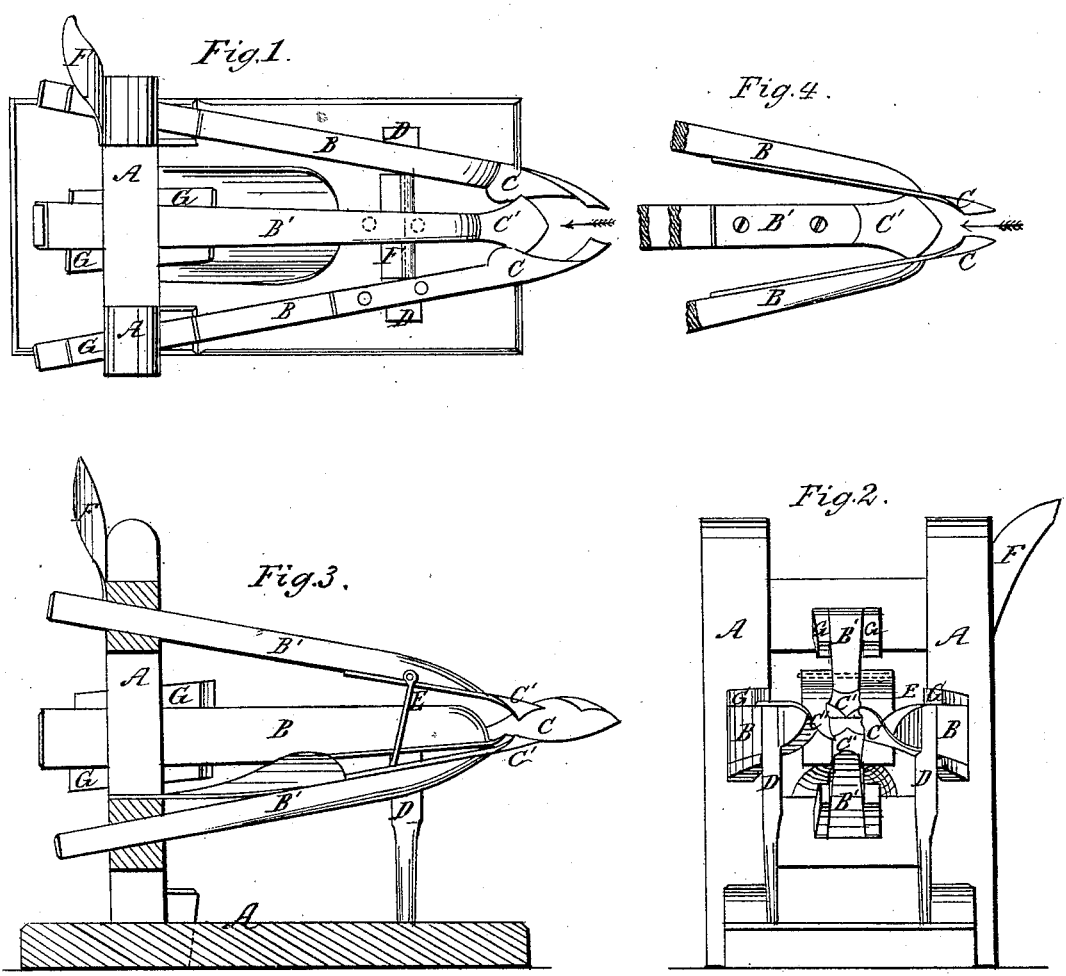

UNITED STATES PATENT OFFICE.

WM. GLADDEN AND RICHD. F. BISHOP, OF CHROME HILL, MARYLAND.

IMPROVEMENT IN CANE-STRIPPERS.

Specification forming part of Letters Patent No. 50,350, dated October 10, 1865.

*To all whom it may concern:*

Be it known that we, WILLIAM GLADDEN and RICHARD F. BISHOP, of Chrome Hill, in the county of Harford and State of Maryland, have invented a new and useful Improvement in Sorghum-Cane Strippers; and we do hereby declare the following to be a full and exact description of the same, reference being had to the accompanying drawings, making part of this specification, in which—

Figure 1 is a plan or top view of our improved cane-stripper. Fig. 2 is a front elevation thereof. Fig. 3 is a vertical longitudinal section of the same. Fig. 4 illustrates a modification of the cutters, hereinafter referred to.

Similar letters of reference indicate corresponding parts in the several figures.

Our invention consists, chiefly, in the employment of a set of cutters opened out or extended with relation to each other to admit of the ready insertion of the stalks, and automatically contracted in such a way as to snugly embrace the stalk and sever the blades therefrom without bruising its cuticle, as will be hereinafter described.

In order that others skilled in the art to which our invention appertains may be enabled to fully understand and use the same, we will proceed to describe its construction and operation.

In the accompanying drawings, A may represent the various parts of a frame in which are secured four projecting elastic arms, B B B' B', which converge in the manner clearly shown in Figs. 1 and 3. The arms B B carry spiral cutters or knives C C, and the arms B' B' carry knives of converging and convex form, C' C'. The form of these knives is clearly illustrated in Fig. 1. To attach the knives to the arms, screws, rivets, or other contrivances may be used.

The arms B B are retained in a stationary position by the vertical supports D D; but the arms B' B' are adapted to be deflected, so as to cause the knives C' C' to approach or recede from each other, in order to allow the stalk to enter between them without impediment, and be there snugly embraced.

Pivoted to the upper arm B' is a falling gate, E, constructed of wood, sheet-iron, or any suitable material, and operating in such a manner as to cause the two elastic arms B' B' to recede from each other when the falling gate is drawn into vertical position. This falling gate E serves to enlarge the space between the four knives, so that the first stalk may be passed between them. The stalk thus first introduced comes in contact with the gate E and pushes the same backward and upward, whereby the knives C' C' are allowed to contract and seize the sorghum-stalk, ready to strip the blades therefrom as it is drawn through.

The arms B B B' B' are secured in the frame A by means of keys G, as clearly shown in Figs. 1 and 2, to allow of their adjustment, if required. The arms B B project from the standards and the arms B' B' from the cross-pieces of the frame A.

On the rear part of the right standard of the frame A, and near its top, is secured a knife or cutter, F, in an upward-inclined position, as shown in Figs. 1, 2, and 3, on which the operator cuts the heads of the stalks.

Operation: The operator stands in front of the apparatus, and, after having severed the head of the stalk by a blow across the knife F, he pulls the falling gate E toward himself into a vertical position, thereby opening out the cutters C' C', and allowing him to pass the end of the cane or stalk between the knives. The falling gate is now by the stalk pushed up and backward, allowing the knives to contract and seize the cane or stalk firmly, in such a manner, however, that on its being pulled through the knives by an attendant stationed in the rear end of the machine the knives will cut or strip the blades from the stalk closely and cleanly without injuring the cuticle in the least. After one stalk has been passed between the knives it is only necessary for the operator to let another one follow as fast as the attendant pulls them through from the rear end. We do not wish, however, to confine ourselves to the spiral form of the knives C C on the arms B B.

In Fig. 4 of our drawings are represented a set of knives of converging, convex, and straight form, which may be used with the same success and facility as the knives above described. Either will answer the purpose, according to the nature and shape of the stalk or cane.

Instead of being hinged at top the gate E may be pivoted at its center in any suitable way.

A rack may be attached to the machine under the knife F, to receive the cane-tops, and another to receive the stripped cane, ready for binding.

Having thus described our invention, the following is what we claim as new and desire to secure by Letters Patent:

1. The knife F, attached to the standard in convenient position for the operator, whereby the top of the cane is struck off preparatory to stripping off its blades.

2. The pendent gate E, for enlarging the opening between the cutting-knives C C C' C' for the introduction of the first stalk, substantially as described.

The above specification of our improved cane-stripper signed this 8th day of September, A. D. 1864.

WILLIAM GLADDEN.
    RICHD. F. BISHOP.

Witnesses:
 EDWARD H. KNIGHT,
 CHARLES D. SMITH.